(12) United States Patent
Chen

(10) Patent No.: US 11,650,391 B2
(45) Date of Patent: May 16, 2023

(54) PPTC HEATER AND MATERIAL HAVING STABLE POWER AND SELF-LIMITING BEHAVIOR

(71) Applicant: Littelfuse, Inc., Chicago, IL (US)

(72) Inventor: Jianhua Chen, Sunnyvale, CA (US)

(73) Assignee: Littelfuse, Inc., Chicago, IL (US)

( * ) Notice: Subject to any disclaimer, the term of this patent is extended or adjusted under 35 U.S.C. 154(b) by 481 days.

(21) Appl. No.: 16/800,684

(22) Filed: Feb. 25, 2020

(65) Prior Publication Data

US 2021/0263258 A1 Aug. 26, 2021

(51) Int. Cl.
| | |
|---|---|
| *G02B 7/02* | (2021.01) |
| *H05B 3/03* | (2006.01) |
| *H05B 3/14* | (2006.01) |
| *H05B 3/26* | (2006.01) |
| *H01C 1/14* | (2006.01) |
| *H01C 7/02* | (2006.01) |

(52) U.S. Cl.
CPC ........... *G02B 7/028* (2013.01); *H01C 1/1406* (2013.01); *H01C 7/02* (2013.01); *H05B 3/03* (2013.01); *H05B 3/146* (2013.01); *H05B 3/26* (2013.01); *H05B 2203/02* (2013.01); *H05B 2214/04* (2013.01)

(58) Field of Classification Search
CPC ...... G02B 7/028; G03B 17/55; H01C 1/1406; H01C 7/02; H05B 3/03; H05B 2203/02
See application file for complete search history.

(56) References Cited

U.S. PATENT DOCUMENTS

| | | | | |
|---|---|---|---|---|
| 2002/0177644 | A1* | 11/2002 | Blok | C08K 3/04 524/425 |
| 2011/0315672 | A1* | 12/2011 | Benda | H05B 3/565 219/385 |
| 2012/0170119 | A1* | 7/2012 | Chu | G03B 11/00 359/512 |
| 2015/0327330 | A1* | 11/2015 | Lochmann | B60N 2/5685 219/494 |
| 2018/0186964 | A1* | 7/2018 | Fu | C08L 23/06 |
| 2018/0263082 | A1* | 9/2018 | Richmond | H05B 3/84 |
| 2019/0041630 | A1* | 2/2019 | Park | G02B 7/028 |

FOREIGN PATENT DOCUMENTS

| | | |
|---|---|---|
| FR | 2792764 A3 | 10/2000 |
| GB | 2551789 A | 1/2018 |
| WO | 2018046548 A1 | 3/2018 |
| WO | 2018185627 A1 | 10/2018 |

OTHER PUBLICATIONS

Translation of WO 2018/046548 A1 (Year: 2018).*
Extended European Search Report dated Jul. 26, 2021 for European Patent Appln No. 21157990.9.

* cited by examiner

*Primary Examiner* — Erin E McGrath
(74) *Attorney, Agent, or Firm* — KDW Firm PLLC

(57) ABSTRACT

A resistance heater may include a polymer positive temperature coefficient (PPTC) material, arranged in a ring shape that defines a heater body; and an electrode assembly, comprising two or more electrodes arranged in contact with the heater body at two or more locations, wherein PPTC material comprises: a polymer matrix, the polymer matrix defining a PPTC body; and a conductive filler component, disposed in the polymer matrix.

14 Claims, 8 Drawing Sheets

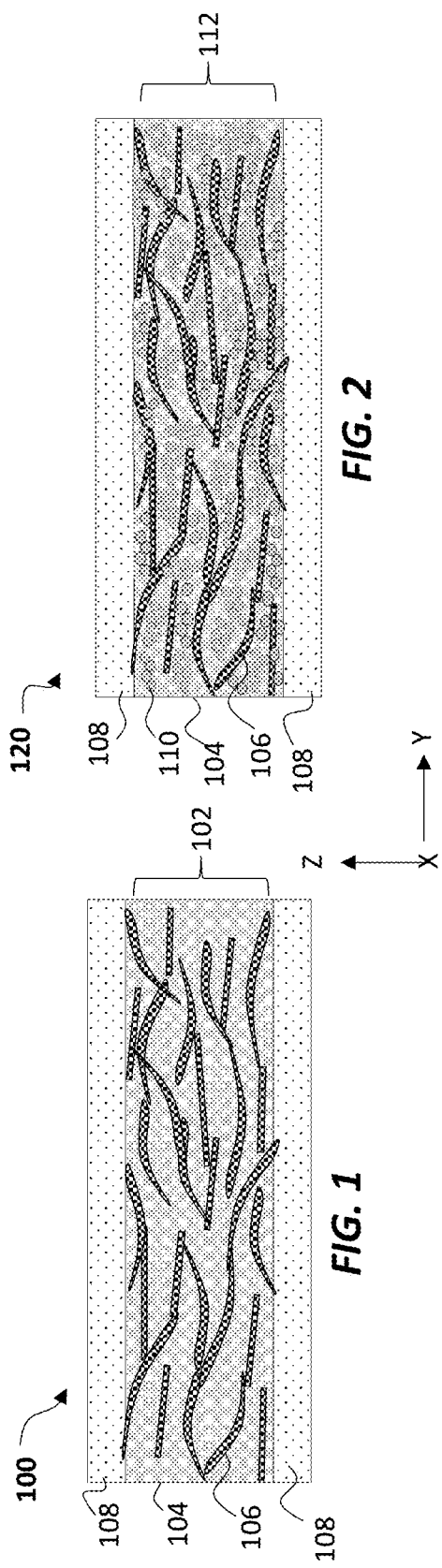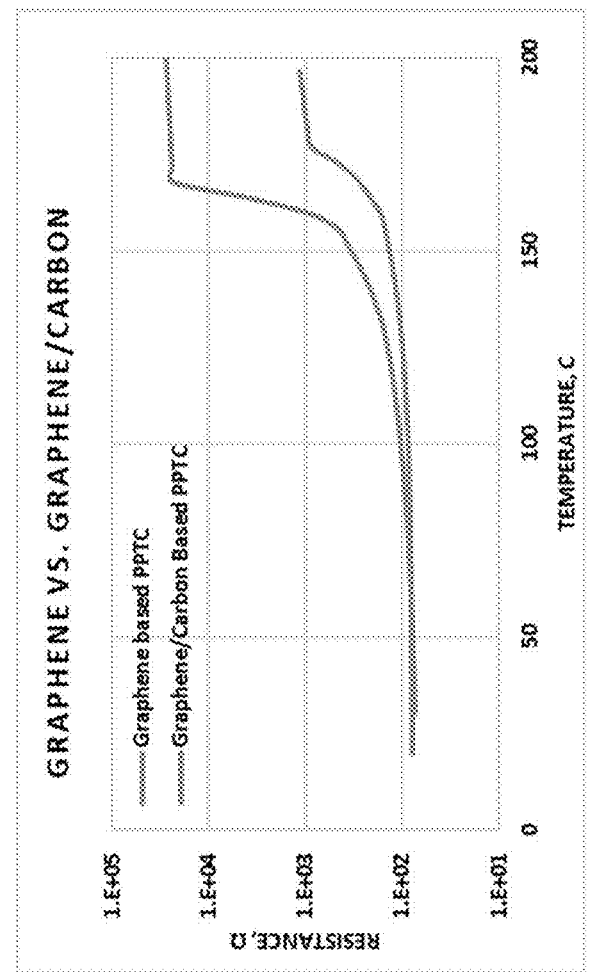
FIG. 1
FIG. 2
FIG. 3

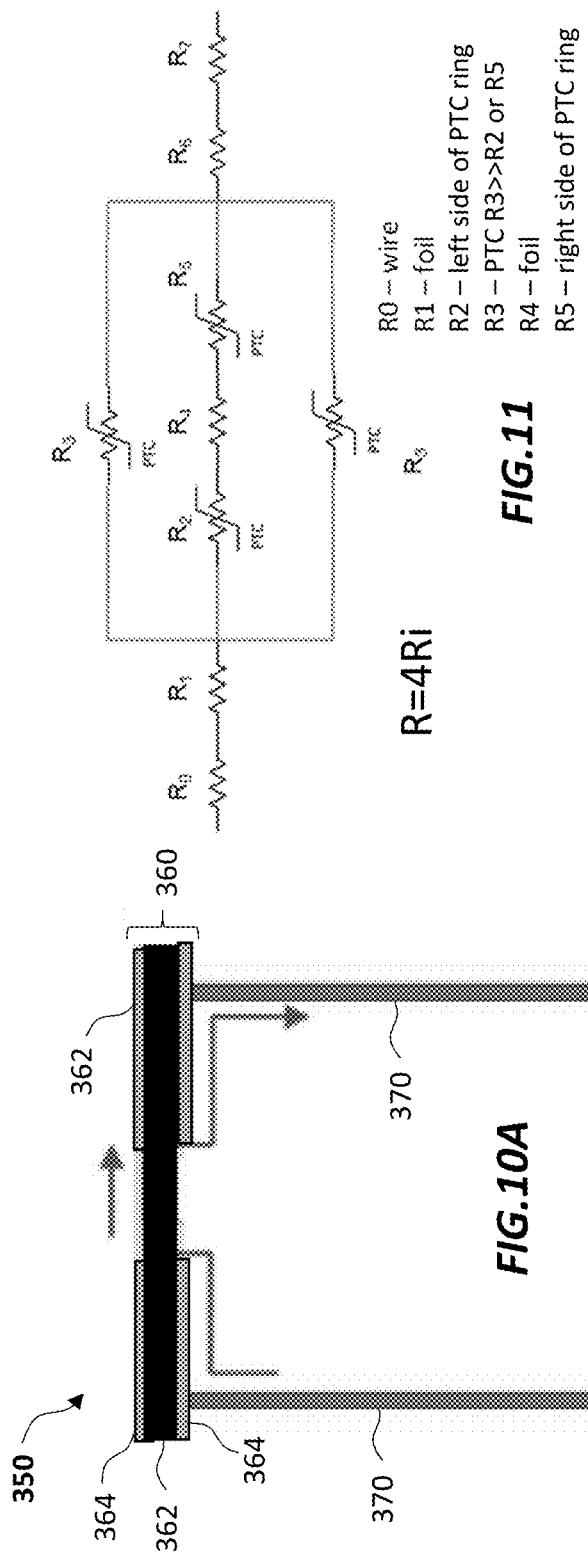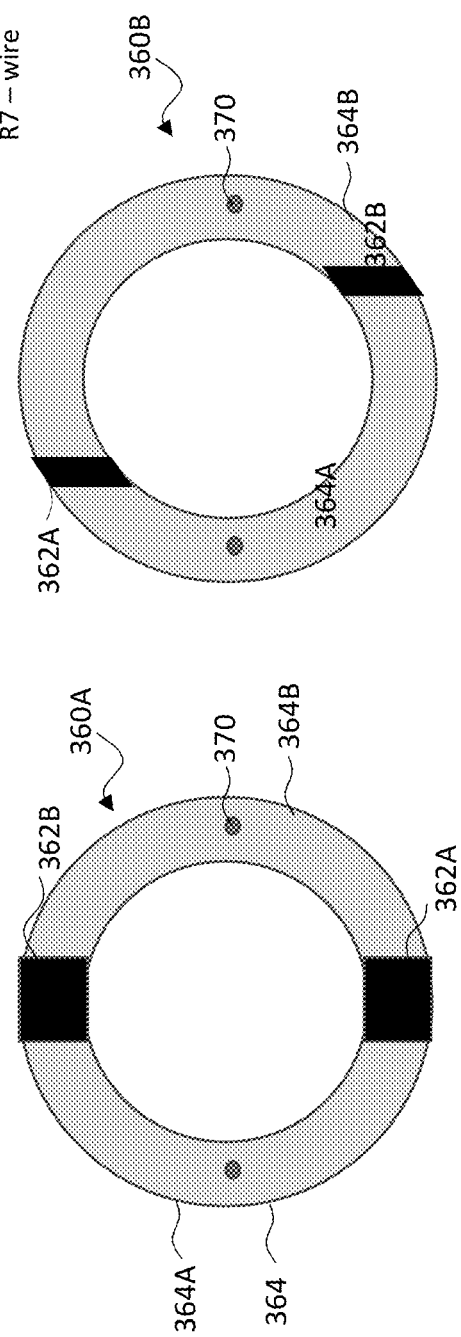

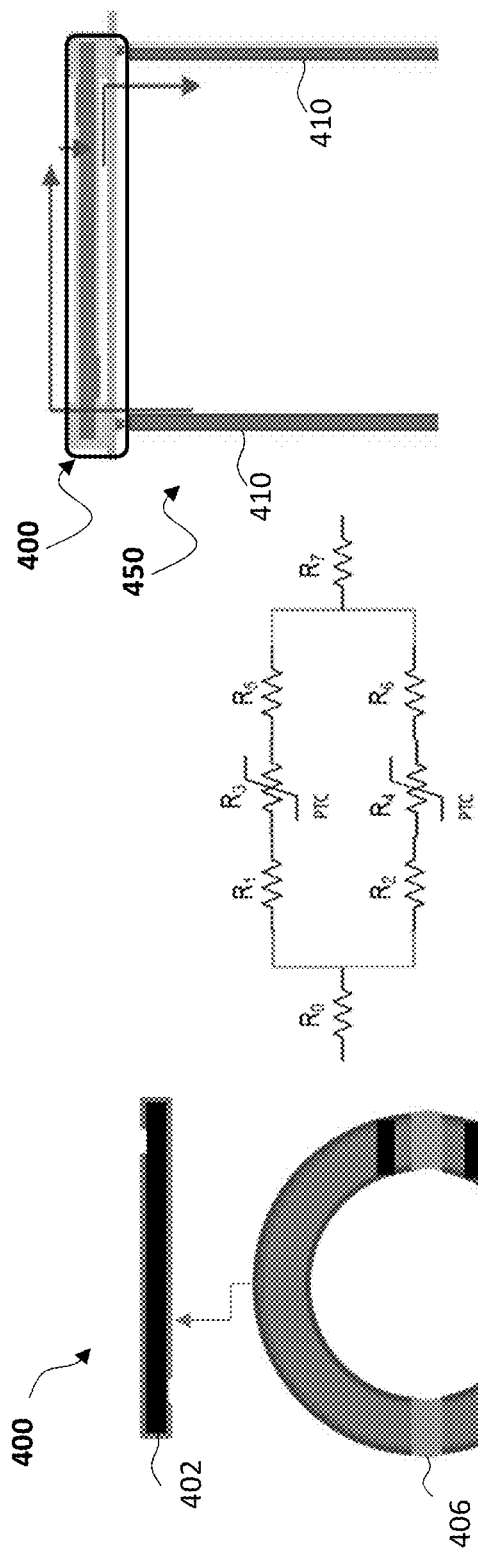

PPTC HEATER AND MATERIAL HAVING STABLE POWER AND SELF-LIMITING BEHAVIOR

BACKGROUND

Field

Embodiments relate to the field of resistance heaters, and more particularly to heaters based upon PPTC materials.

Discussion of Related Art

Polymer positive temperature coefficient (PPTC) devices may be used as overcurrent or over-temperature protection devices, as well as current or temperature sensors, among various applications. For polymer positive temperature coefficient materials, the electrical resistance increases with the increase of temperature due to the thermal expansion of the polymer matrix that contains a dispersed conductive material (filler), such as a conductive metal particle phase, or a conductive carbon particle phase or ceramic conductive phase. At a trip temperature, where the polymer matrix may undergo a phase transition, such as a melting transition, a concomitant large increase in polymer volume may generate a sharp increase in resistance as the conductive filler particles separate from one another resulting in the disruption of electrically conductive paths. Upon cooling down, as the polymer volume shrinks, the resistivity of the PPTC material may return to the relatively lower values below the trip temperature. Such behavior makes PPTC materials suitable for applications such as resettable fuses. In general, the overall conductivity of a PPTC material and the increase in resistance with temperature depends upon the conductive filler content, where electrical resistance tends to increase with increased temperature to a greater extent for high resistivity (10~10000 ohm-cm) PPTC material, because of low conductive filler content, even below the trip temperature. The increased resistance below the trip temperature will cause more I-R heating of the PPTC material, and may lead to an abnormal trip of a PPTC device. Accordingly, for applications where stable electrical operation below the trip temperature is useful, known PPTC materials may be of limited use.

With respect to this and other considerations the present disclosure is provided.

BRIEF SUMMARY

In one embodiment, a resistance heater may include a polymer positive temperature coefficient (PPTC) material, arranged in a ring shape that defines a heater body; and an electrode assembly, comprising two or more electrodes arranged in contact with the heater body at two or more locations, wherein PPTC material comprises: a polymer matrix, the polymer matrix defining a PPTC body; and a conductive filler component, disposed in the polymer matrix.

In another embodiment a camera may include a transparent lens portion; and a resistance heater, disposed on a periphery of the transparent lens portion. The resistance heater may include a polymer positive temperature coefficient (PPTC) material, arranged in a ring shape within a plane, and defining a heater body, wherein the PPTC material comprises: a polymer matrix, the polymer matrix defining a PPTC body, and a conductive filler component, disposed in the polymer matrix. The resistance heater may further include an electrode assembly, comprising a bottom electrode on a first side of the heater body, and a top electrode, disposed on a second side of the heater body, opposite the first side.

BRIEF DESCRIPTION OF THE DRAWINGS

FIG. 1 shows a PPTC component in accordance with embodiments of the disclosure;

FIG. 2 shows another PPTC component in accordance with embodiments of the disclosure;

FIG. 3 illustrates resistance as a function of temperature for exemplary PPTC materials, according to embodiments of the disclosure;

FIG. 10A depicts a side view of an exemplary PPTC resistance heater 350, according to embodiments of the disclosure;

FIG. 10B and FIG. 10C depict alternate variants of the resistance heater component of FIG. 10A in plan view;

FIG. 11 provides a circuit depiction of an exemplary PPTC based resistance heater;

FIG. 12 depicts an exemplary PPTC based resistance heater component, according to embodiments of the disclosure;

FIG. 13 provides a circuit depiction of an exemplary PPTC based resistance heater;

FIG. 14 depicts an exemplary a PPTC resistance heater, according to embodiments of the disclosure;

DESCRIPTION OF EMBODIMENTS

Figure 4:
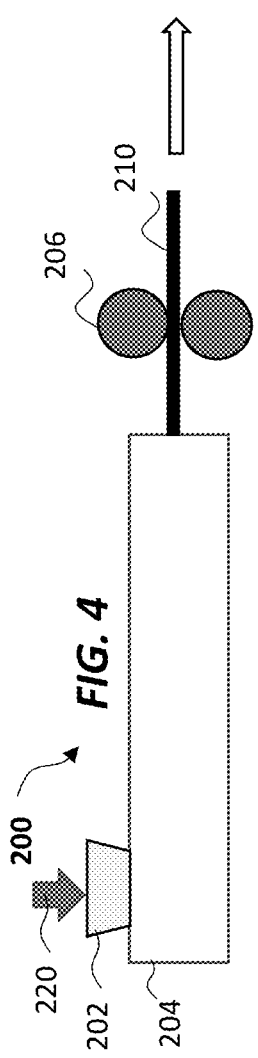
FIG. 4 illustrates a schematic depiction of processing of a PPTC component, according to embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, a novel PPTC material is provided, including a conductive filler having nano-sized carbon filler material, such as a single-wall carbon nanotube, multi-wall carbon nanotube or graphene. The PPTC material may include a polymer matrix such as polyethylene, polyethylene copolymer, polyester, polyurethane, polyamide, fluorine-based polymer resin, or a blend of fluoropolymers with other polymers. The PPTC material may include an antioxidant, dispersion agent, cross-linker, arc suppressant, and so forth, in various non-limiting embodiments. etc. As detailed below, an advantage afforded by the PPTC material of the present embodiments is a stable power over a temperature range from room temperature to a maximum use temperature, where the power may vary by less than 60%, such as 50%-60%, or in some embodiments, by less than 30%, such as between 20% to 30%.

Particular embodiments are based on a polymeric positive temperature coefficient (PPTC) material formed from a graphene filler and a semi-crystalline polymer matrix. The stable resistance behavior imparted by such PPTC material affords new applications, such as resistance heaters that employ a PPTC component. The stable resistance behavior results in stable heater power behavior as a function of temperature below the melting point of the polymer matrix, generally associated with the trip temperature of the PPTC component. Another advantage is the uniform and effective heat transfer. Moreover, because the resistivity and trip temperature may be tailored by tailoring the type of polymer, conductive filler, and volume fraction of conductive filler, the power consumption and power limitation temperature can be customized according to an application for a resistance heater.

In particular embodiments, a PPTC material may be arranged as a polymer matrix, having the shape and size to define a PPTC body, according to a desired application. As an example a PPTC heater may be arranged as a planar heater, including a ring-shaped heater or other suitable shape. The PPTC material may also include a graphene filler component, disposed in the polymer matrix, where the graphene filler component if formed from a plurality of graphene sheets that are aligned along a predetermined plane of the PPTC body, such as the main plane of a ring-shaped PPTC component.

While in some embodiments the PPTC material may include a conductive filler formed just of graphene filler, in other embodiments, a second conductive filler may be added in addition to the graphene filler, such as a known carbon filler. FIG. 1 shows a PPTC component in accordance with embodiments of the disclosure. The PPCT component 100 includes a PPTC body 102, which body in turn includes a polymer matrix 104, and graphene filler 106, dispersed as microscopic sheets within the polymer matrix 104. The PPTC component 100 further includes a pair of opposing electrodes, shown as electrodes 108, where an external voltage may be applied to drive current through the PPTC body 104 between the opposing electrodes. Non-limiting examples of suitable polymers for the polymer matrix 104 include semi-crystalline polymers such as. polyethylene, polyester, polyvinylidene fluoride, ethylene tetrafluoroethylene, ethylene-vinyl acetate, ethylene and acrylic acid copolymer, ethylene butyl acrylate copolymer, poly-perfluoroalkoxy.

The volume percentage of polymer matrix in the PPTC body 102 may range between 50~99% in some embodiments, and between 60~95% in particular embodiments. In various non-limiting embodiments, the volume fraction of graphene may range from 1%~50%, and in particular embodiments from 4%~30%. The graphene for graphene filler 106 may be prepared by mechanical or chemical means, where graphene particles are formed from layers of graphene sheets where the number of graphene sheets ranges from one to several hundred within a particle according to various embodiments, and from one to approximately 30 layers in particular embodiments. Thus, the graphene particle, formed from a number of graphene sheets, may also have a two-dimensional sheet-like shape. According to some embodiments, the resulting graphene particle size may range from 0.1 μm to 100 μm, and in particular from 1 μm~30 μm.

By way of background, graphene is a crystalline allotrope of carbon with 2-dimensional properties. The carbon atoms are densely packed in a regular atomic-scale hexagonal pattern in graphene. Graphene has high thermal conductivity in the range of 1500-2500 $W \cdot m^{-1} \cdot K^{-}$ In the embodiment of FIG. 1, the graphene filler is arranged as sheet-like particles where the particles, meaning the plane of the sheets, is aligned generally along a predetermined plane of the PPTC body 104, such as along the X-Y plane of the Cartesian coordinate system shown. The high thermal conductivity of the graphene filler 106 allows heat transfer to the environment along the Z-direction effectively, as well as uniform heat transfer in the X-Y plane. These thermal properties are particularly useful for heater applications. Additionally, a graphene sheet has a bulk electrical resistivity as low as $10^{-6}$ Ω-cm the most conductive metals have bulk resistivity of close to $2 \times 10^{-6}$ Ω-cm or higher. In addition, the graphene 2D-structure allows a semi-crystalline polymer in the polymer matrix 104 to contact two sides of a graphene particle so that PPTC material can respond to temperature synchronously when the polymer matrix 104 reaches a melting point.

FIG. 2 shows another PPTC component 120 in accordance with embodiments of the disclosure. In this example, the PPTC component 120 may be arranged generally the same as PPTC component 100, described above, where like components are labeled the same. The PPTC component 120 differs from the PPTC component 100 in that the PPTC body 112 further includes a conductive component 110, which component may be a carbon filler and/or a ceramic conductive component, disposed as a plurality of carbon particles or ceramic conductive particles (such as TiC, or WC) within the polymer matrix 106. As such, the conductive component 110 may modify the electrical properties of the PPTC component 120 with respect to the electrical properties of PPTC component 100.

FIG. 3 illustrates resistance as a function of temperature for exemplary PPTC materials, according to embodiments of the disclosure. In this case, the two different curves represent behavior of two different PPTC materials, as generally arranged in FIG. 1 and FIG. 2, respectively. The lower curve corresponds to the PPTC component 100, while the upper curve corresponds to the PPTC component 120. In both examples, the resistance from room temperature to approximately 140° C.-150° C. is relatively low and stable, while increasing rapidly at a trip temperature 170 C. The resistance increases up to 900 Ohms or above for the pure-graphene component, while increasing up to 24,000 Ohms or above for the PPTC component having graphene and carbon filler. Notably, in both examples, the low temperature resistance below the trip temperature is very stable.

FIG. 4 illustrates a schematic depiction of processing of a PPTC component, according to embodiments of the disclosure. To form a suitable PPTC component, such as for heater applications, the PPTC material may be extruded in an extrusion apparatus to form PPTC layers or sheets. Generally, PPTC material 220, such as a mixture of polymer material and graphene particles, may be added to an receptacle 202 that is coupled to an extrusion chamber 204, where the PPTC material 220 may be mixed heated, and drawn, by extrusion components 206 to form a PPTC body 210, in the form of a sheet or layer.

Figure 5:
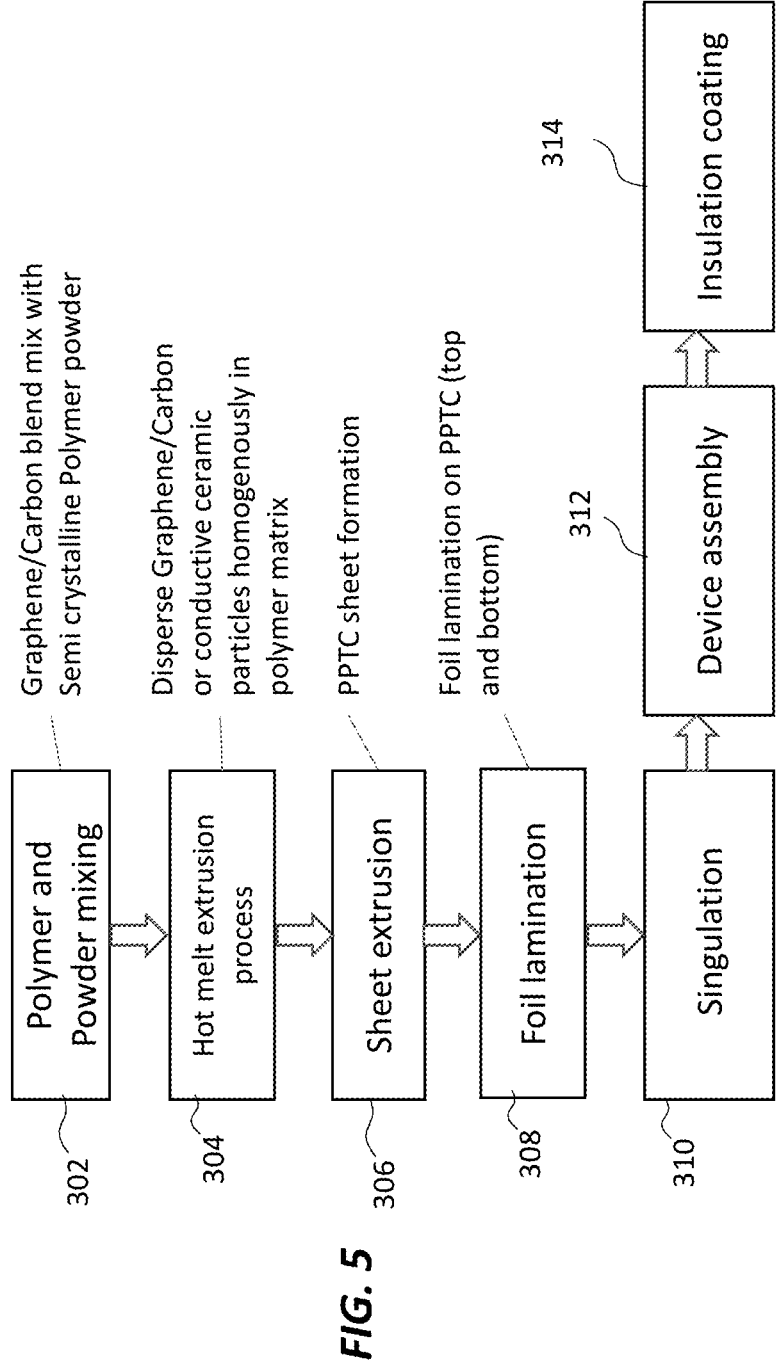
FIG. 5 depicts an exemplary process flow.

FIG. 5 depicts an exemplary process flow 302. At block 302, a polymer material and a conductive powder and optional additives are mixed together. The polymer material may be a powder of a semicrystalline polymer, while the conductive filler includes graphene particles, and optionally may further include carbon and/or conductive ceramic particles. At block 304, a hot melt process is performed, where mixed components such as polymer and conductive filler are heated to a temperature to melt the polymer and to accordingly disperse the conductive filler particles more homogeneously within the polymer matrix. At block 306, sheet extrusion to form a sheet of PPTC material is performed, where the melted mixture of polymer and conductive filler is extruded to form a PPTC sheet or layer. At block 308 a conductive metal layer (foil) may be applied to the top surface and bottom surface of the extruded PPTC sheet to form a laminated body. At block 310, a PPTC component or a plurality of PPTC components are formed by singulating the laminated body to form individual components, including a PPTC body sandwiched between opposing electrodes. In some examples, the singulated PPTC body may have a shape of a ring, such as a circular ring, a rectangular ring, oval shaped ring, elliptical shaped ring, or polygonal ring. At block 312, the singulated PPTC body is assembled into a device, such as a heater. For example, the singulated PPTC body may be attached to leads (wires) that are connected to the opposing electrodes to form a PPTC heater. Optionally, the heater may be incorporated into another structure, such as a camera or other structure to be heated. At block 314, insulated coating may be applied to encapsulate components of the PPTC heater. For example, the insulated coating may be formed by an electrophoretic deposition in a chemical bath; to form a parylene coating by CVD; or to form other insulation coating.

Figure 6A:
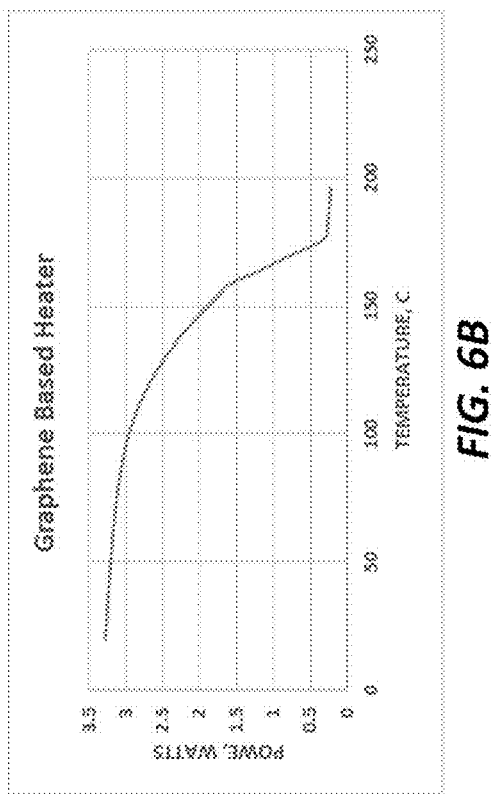
FIG. 6A and FIG. 6B illustrate exemplary resistance and power curves, respectively, as a function of temperature for an exemplary resistance heater, in accordance with embodiments of the disclosure.
Figure 6B:
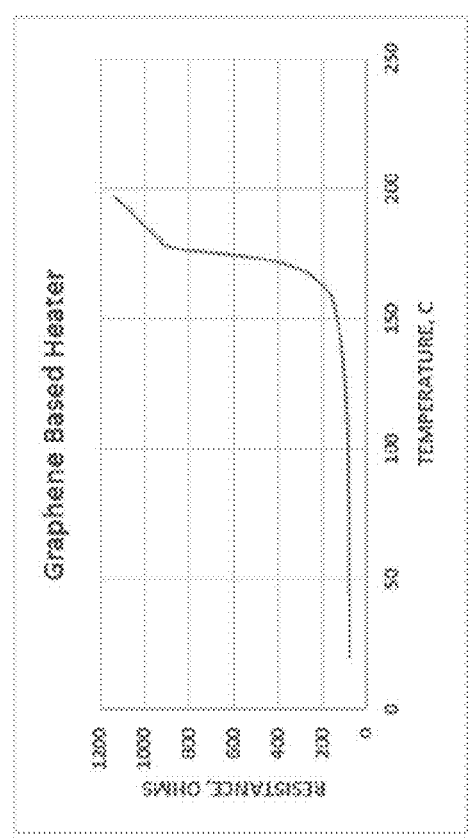

Turning now to FIG. 6A and FIG. 6B, there are shown illustrate exemplary resistance and power curves, respectively, as a function of temperature for an exemplary resistance heater, in accordance with embodiments of the disclosure. The exemplary heater is formed from a PPTC material having a graphene filler and polymer matrix. As shown in FIG. 6A, resistance does not vary substantially from 25° C. to approximately 150° C., and then increases sharply above 170° C. Conversely, power consumption remains between 3.3 watts and 3 watts up to 100 C, decreases gradually to 1.8 W at 150° C., and more sharply above 150° C. to about 0.2 watts at 175° C., and limits the power around at melting point of polymer.

Figure 7A:
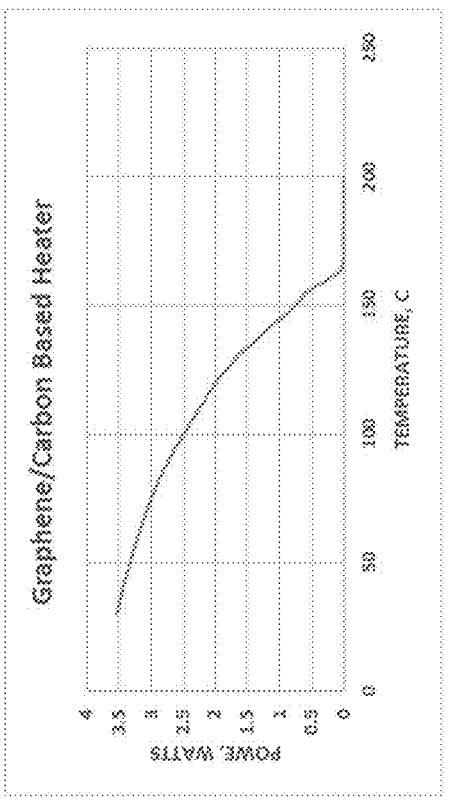
FIG. 7A and FIG. 7B illustrate exemplary resistance and power curves, respectively, as a function of temperature for another exemplary resistance heater, in accordance with embodiments of the disclosure.
Figure 7B:
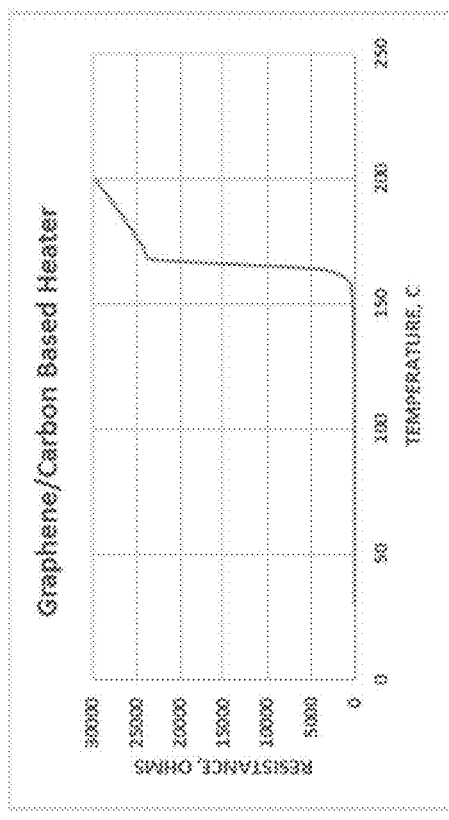

FIG. 7A and FIG. 7B illustrate exemplary resistance and power curves, respectively, as a function of temperature for another exemplary resistance heater, in accordance with embodiments of the disclosure. The exemplary heater is formed from a PPTC material having a graphene filler, plus carbon filler and polymer matrix. As shown in FIG. 7A, resistance does not vary substantially from 25° C. to approximately 150° C., and then increases sharply above 170° C. Conversely, power consumption decreases from 3.3 watts to about 2.6 watts up to 100° C., then decreases more rapidly to close to zero watts at 170 C. The above results show how heater properties can be tailored by adding carbon to a graphene based PPTC body.

Figure 7C:
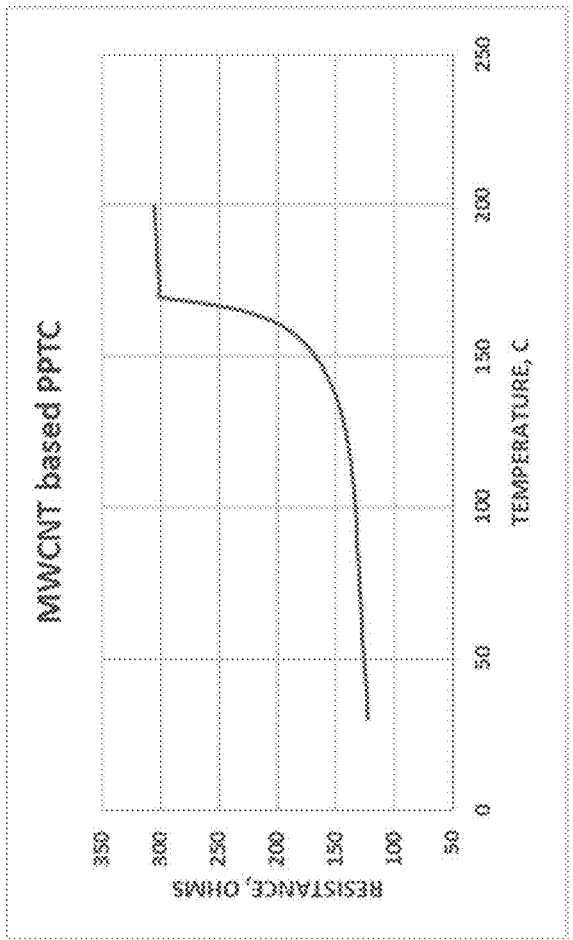
FIG. 7C and FIG. 7D illustrate exemplary resistance and power curves, respectively, as a function of temperature for another exemplary resistance heater, in accordance with embodiments of the disclosure.
Figure 7D:
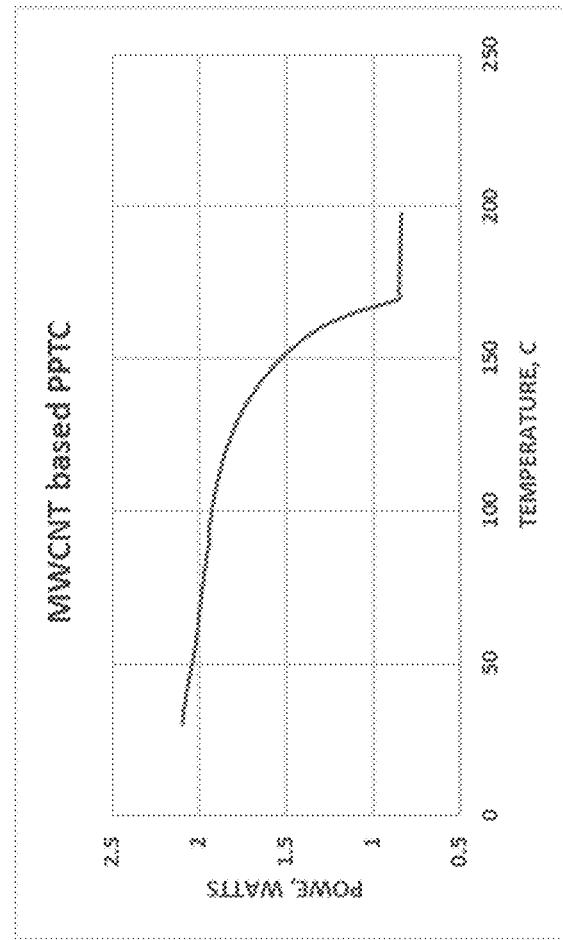

In other embodiments of the disclosure a PPTC heater may be formed from a PPTC material having a filler formed from carbon nanotube material, such as a single wall or multiwall carbon nanotube material. FIG. 7C and FIG. 7D illustrate exemplary resistance and power curves, respectively, as a function of temperature for another exemplary resistance heater, in accordance with embodiments of the disclosure. The exemplary heater is formed from a PPTC material having a carbon nanotube filler and polymer matrix. As shown in FIG. 7D, below 150 C the level of power is relatively more stable than for a PTC heater based upon carbon filler, as discussed below with respect to FIG. 9.

Figure 8A:
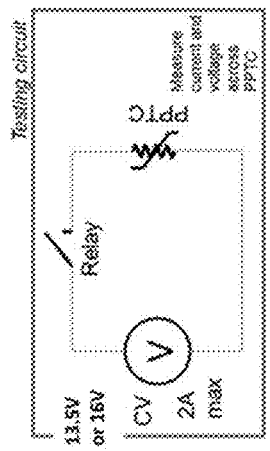
FIG. 8A depicts an exemplary test circuit for measuring electrical behavior of a PPTC device.
Figure 8:
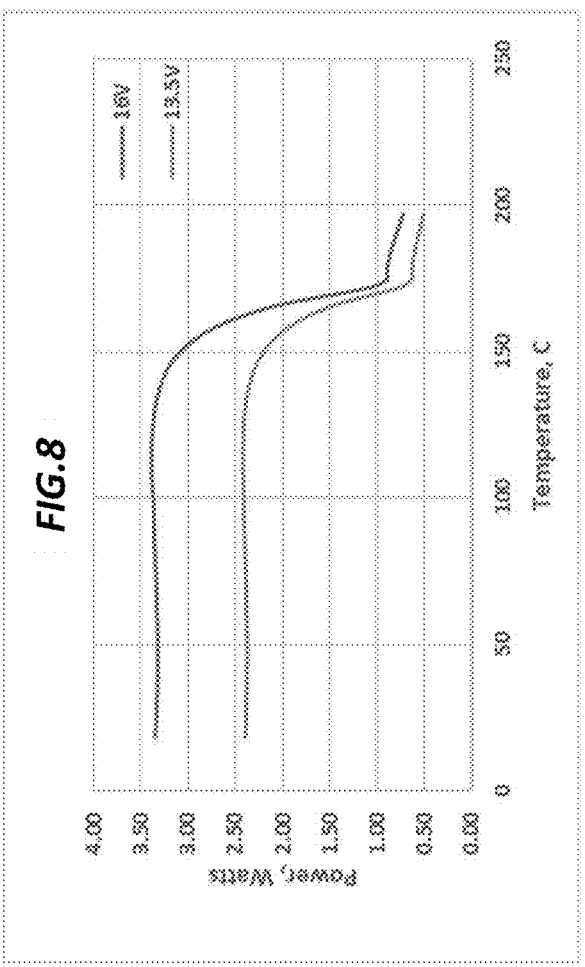
FIG. 8 illustrates exemplary power curves, as a function of temperature for another exemplary resistance heater, in accordance with embodiments of the disclosure.

FIG. 8 illustrates exemplary power curves, as a function of temperature for another exemplary resistance heater, in accordance with embodiments of the disclosure. FIG. 8A depicts an exemplary test circuit for measuring electrical behavior of a PPTC device. In FIG. 8, there are shown two power curves, one for 16 V applied to the heater, and another for 13.5 V applied to the heater. The higher voltage case is shown to drive a higher power (compare 3.4 watts to 2.4 watts. However, for both cases, the power remains nearly constant between 20° C. and 140° C., then decreasing rapidly above 150° C. before reaching a power level below 1 Watt above 170° C. The decreased power above 150° C. is reflective of the tripping of the PPTC heater, where resistance increases rapidly, thus limiting current and total power for a given applied voltage. Thus, the heater elements of the PPTC material of FIG. 8 function to provide uniform power over a large temperature range before decreasing to a limited power above the trip temperature.

Figure 9:
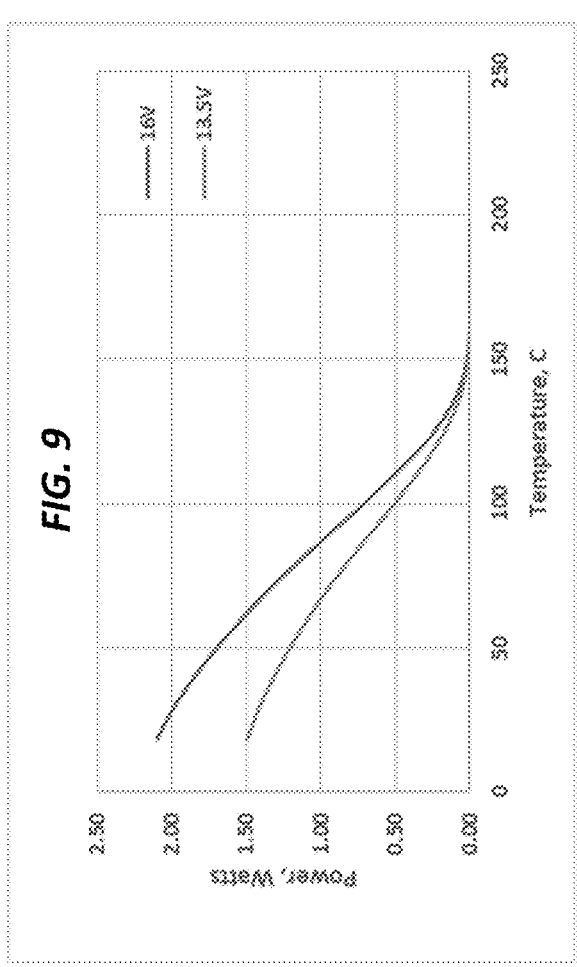
FIG. 9 illustrates power curves, as a function of temperature for a reference exemplary heater.

By way of comparison, FIG. 9 illustrates power curves, as a function of temperature for a reference heater based upon PPTC without graphene filler. In FIG. 9, there are also shown two power curves, one for 16 V applied to the heater, and another for 13.5 V applied to the heater. The higher voltage case is shown to drive a higher power (compare 2.1 watts to 1.5 Watts. However, for both cases, the power decreases continuously and substantially between 20° C. and 140° C., reaching essentially zero Watts power above 150° C. Thus, such a resistance heater does not exhibit stable power output over a useful temperature range, such as below the trip temperature, between room temperature and 150° C.

In accordance with various embodiments of the disclosure, a PPTC heater may be adapted for use in components, such as in a camera. In the embodiments to follow with respect to FIGS. 10A-15 there as shown novel configurations for PPTC resistance heaters, including the incorporation of the PPTC resistance heaters in a camera. According to various embodiments, the PPTC resistance heaters may be based upon known PPTC materials, such as carbon-filled polymers, or may be based upon graphene-filled polymers, as described generally in the aforementioned embodiments. The PPTC heaters based upon graphene-filled polymers may be especially suitable for applications where stable current operation over an extended temperature range is called for.

FIG. 10A depicts a side view of an exemplary PPTC resistance heater 350, according to embodiments of the disclosure. The resistance heater 350 includes the PPTC resistance heater component 360 as well as external wires 370. The resistance heater component may be arranged generally as described above with respect to the embodiments of FIGS. 1-2, for example. The resistance heater component 360 may have a ring shape when viewed in plan view, so as to border a periphery of a component to be heated, such as a camera. The arrows depict a current path for current flowing from the left hand wire 370, through the PPTC resistance heater component 360, and out the right hand wire 370. FIG. 10B and FIG. 10C depict alternate variants of the resistance heater component 360 in plan view. The resistance heater component 360 includes a PPTC body 362 arranged as a circular ring body, and opposing electrodes, shown as electrodes 364. As shown in FIG. 10B, for example, a resistance heater component 360A is arranged with the opposing electrodes as two ring segments, shown as segments 364A and 364B, where a portion of the circular ring body is exposed, as shown, in exposed region 362A and exposed region 362B. The configurations of FIG. 10C and FIG. 10B differ from one another in the relative placement of the segments 364A and 364B from one another, as well as the shape and size of the exposed region 362A and exposed region 362B. Because of this configuration, as shown in FIG. 10A, current, flowing through the path of least resistance, may flow from the left hand wire 370, vertically to the lower of the electrodes 364, then laterally along the electrode 364 along the lower surface of the PPTC body. The break in the electrode 364 may then cause the current to flow vertically to an upper surface, then laterally along the upper surface, vertically from the upper surface to the lower surface of the PPTC body, laterally along the lower electrode, and vertically out the right hand wire 370.

FIG. 11 provides a circuit depiction of the exemplary PPTC based resistance heater of FIG. 10. The elements R0 and R7 indicate resistance from the wires 370. The elements R1, R4, and R6 indicate the resistance from foils, while the elements R2, R3, and R5, indicate the resistance from the PTC ring body. As shown, the resistance of element R3 may be greater than the resistance of R2 and R5, generated by the left and right side of the PTC ring.

FIG. 12 depicts an exemplary PPTC based resistance heater component, shown as PPTC heater component 400, according to embodiments of the disclosure. In this example, the PPTC heater component 400 has a flat-ring shape, as illustrated in the side views (top and bottom) and the plan view (middle). The PPTC heater component 400 may be arranged generally as shown in the embodiments of FIGS. 1-2, where a PPTC body 402 is sandwiched between opposing electrodes. In this case, the opposing electrodes may cover large portions of the upper ring surface and lower ring surface.

FIG. 13 provides a circuit depiction of the exemplary PPTC based resistance heater of FIG. 12. The elements R0 and R7 indicate resistance from external wires to be connected to the PPTC heater 400. The elements R1, R2, R5, and R6 indicate the resistance from solder pads, while the elements R3, R4, indicate the resistance from the PTC body.

FIG. 14 depicts a side view of an exemplary PPTC resistance heater 450, according to embodiments of the disclosure. The resistance heater 450 includes the PPTC resistance heater component 400 as well as external wires 410. The arrows depict a current path for current flowing from the left hand wire 410, through the PPTC resistance heater component 400, and out the right hand wire 410. As shown, current may flow from the left hand wire 410, vertically from a lower surface of the PPTC body to an upper surface, then laterally along the upper electrode, vertically from the upper surface to the lower surface of the PPTC body, laterally along the lower electrode, and out the right hand wire 410.

In various embodiments, a PPTC heater may be incorporated into a printed circuit board PCB) For example, the resistance heater component 400 may be incorporated in a resistance heater using a PCB to support a surface mount PTC resistance heater configuration.

Figure 15A:
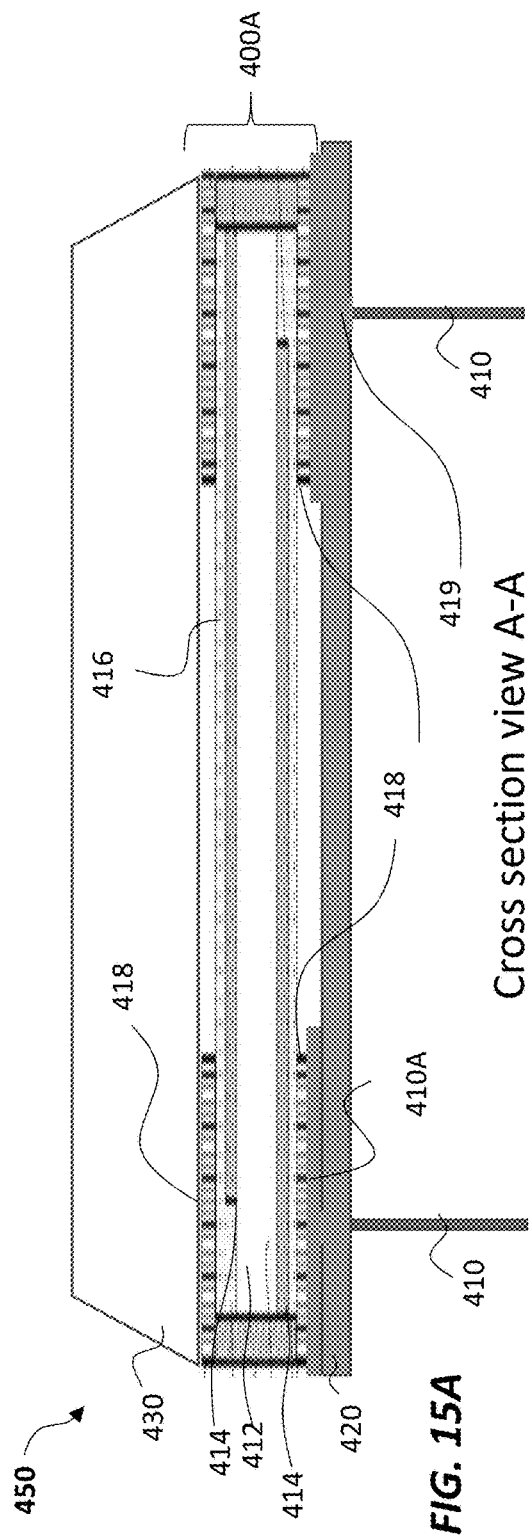
FIG. 15A depicts a cross-section of a novel camera according to embodiments of the disclosure.

As noted, a PPTC resistance heater according to the present embodiments may be incorporated in a camera. FIG. 15A depicts a novel camera 500, including a PPTC resistance heater component 400A, arranged as a ring to be in incorporated in a camera lens assembly. The PPTC resistance heater component 400A may in thermal contact with a camera lens 430 to as to heat the camera lens by resistive heating. Because of the ring shape, the outer periphery of the camera lens 430 may be directly heated. In this manner, the camera lens may be heated to a given amount to drive off moisture or precipitation, for example.

Figure 15B:
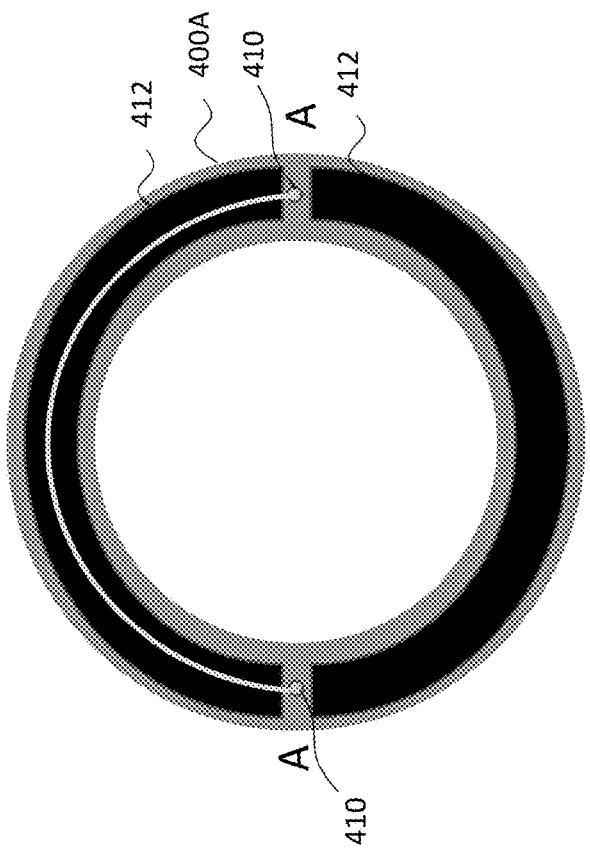
FIG. 15B depicts a plan view and perspective view of components of a heater, according to embodiments of the disclosure.

In the particular embodiment of FIG. 15A, the heater component 400A may conduct the current as shown for heater component 400, discussed above. The heater component 400A includes a PTC body 412, metal foil layers 414, conductive metal portions 418, and insulating layers 416. The heater component 400A may be joined to wires 410 through contact metal 419. In FIG. 15B there is shown a plan view of the heater component 400A, where the top part of FIG. 15A corresponds to a cross-section along the semicircular path A-A shown in FIG. 15B. The heater component 400A may thus be arranged according to surface mount technology. In particular, the heater component 400A may be supported on a PCB ring 420, where the heater component 400A and PCB ring 420 have a ring shape, as shown in FIG. 15B. The heater component 400A may be divided into two segments as shown, in order to generate the current path generally as shown in FIG. 14. Notably, the current between wires 410 may travel in two semicircular parallel paths In various non-limiting embodiments, the total thickness of heater component 400A may be approximately 2 mm, while the thickness of PCB ring 420 is less than 1.5 mm. Non-limiting examples of suitable materials for PCB ring 420 include FR4, copper inlay PCB, or a ceramic PCB, such as $Al_2O_3$ or AlN.

When a PPTC resistance heater according to the present embodiments is incorporated into a camera or other device to be heated, the following advantages may be realized 1) A Self-balance power distribution design; 2) Thin but fully insulated component from the camera housing; 3) specially shape heater capable to fit into a very narrow area; 4) a component where power vs. temperature performance of the resistance heater may be tuned by adjusting filler recipe such as a volume fraction of graphene particles (for graphene-based PPTC materials), as well as optional carbon particles added to a polymer matrix; 5) a resistance heater having stable power generation vs. temperature operation over a wide temperature range (for graphene-based PPTC materials), such as to a maximum operating temperature; 6) higher power generation in a colder environment; 7) lower power generation in warmer environment; and 8) a resistance heater having self-limited power.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A resistance heater, comprising:
a polymer positive temperature coefficient (PPTC) material, arranged in a ring shape that defines a heater body; and
an electrode assembly, comprising two or more electrodes arranged in contact with the heater body at two or more locations,
wherein PPTC material comprises:
a polymer matrix, the polymer matrix defining a PPTC body; and
a conductive filler component, disposed in the polymer matrix, wherein the two or more electrodes comprise a bottom electrode on a first side of the heater body, and a top electrode, disposed on a second side of the heater body, opposite the first side, the top electrode and the bottom electrode being arranged generally in a ring shape, and
wherein the top electrode and the bottom electrode each includes two segments, wherein a first pair of segments in the top electrode are separated from one another by a first gap and a second gap, wherein a second pair of segments in the bottom electrode are separated from one another by a third gap and a fourth gap.

2. The resistance heater of claim 1, the ring shape of the PPTC material comprising a circular ring, a rectangular ring, an elliptical ring, an oval ring, or a polygonal ring.

3. The resistance heater of claim 1, the conductive filler component comprising a carbon filler and/or conductive ceramic component, disposed as a plurality of particles within the polymer matrix.

4. The resistance heater of claim 1, wherein a volume percentage of polymer matrix is between 50~99%.

5. The resistance heater of claim 1, the conductive filler comprising a graphene filler component, and/or a carbon nanotube filler component.

6. The resistance heater of claim 1, further comprising a first lead and a second lead, electrically connected to the electrode assembly, the first lead and the second lead extending perpendicularly to a main plane of the heater body.

7. The resistance heater of claim 1 wherein the heater body is disposed on a printed circuit board (PCB) substrate, the PCB substrate being arranged in a ring shape.

8. The resistance heater of claim 7, the heater body and the electrode assembly together comprising a thickness of approximately 2 mm, and the PCB substrate comprising a thickness less than 1 mm.

9. The resistance heater of claim 7, the PCB substrate comprising FR4, copper inlay PCB, or a ceramic PCB, the ceramic PCB comprising $Al_2O_3$ or AlN.

10. A camera, comprising:
a transparent lens portion; and
a resistance heater, disposed on a periphery of the transparent lens portion, and comprising:
a polymer positive temperature coefficient (PPTC) material, arranged in a ring shape within a plane, and defining a heater body, wherein the PPTC material comprises:
a polymer matrix, the polymer matrix defining a PPTC body, and
a conductive filler component, disposed in the polymer matrix; and
an electrode assembly, comprising a bottom electrode on a first side of the heater body, and a top electrode, disposed on a second side of the heater body, opposite the first side the top electrode and the bottom electrode being arranged generally in a ring shape,
wherein the top electrode and the bottom electrode each includes two segments, wherein a first pair of segments in the top electrode are separated from one another by a first gap and a second gap, wherein a second pair of segments in the bottom electrode are separated from one another by a third gap and a fourth gap.

11. The camera of claim 10, the ring shape of the PPTC material comprising a circular ring, a rectangular ring, an elliptical ring, an oval ring, or a polygonal ring.

12. The camera of claim 10, the filler component comprising a carbon filler component, disposed as a plurality of carbon particles within the polymer matrix.

13. The camera of claim 10, further comprising
a first lead and a second lead, electrically connected to the electrode assembly, the first lead and second lead extending perpendicularly to the plane of the heater body.

14. The camera of claim 10, the conductive filler comprising a graphene filler component and/or a carbon nanotube filler component.

* * * * *